Aug. 19, 1958 R. F. SHAW 2,848,088

MACHINE FOR PRINTING AND CHECKING MUTUALLY SIMILAR RECORDS

Filed Nov. 10, 1955

INVENTOR.
ROBERT F. SHAW

BY Jesse A. Holton

ATTORNEY

United States Patent Office 2,848,088
Patented Aug. 19, 1958

2,848,088

MACHINE FOR PRINTING AND CHECKING MUTUALLY SIMILAR RECORDS

Robert F. Shaw, New York, N. Y., assignor to Underwood Corporation, New York, N. Y., a corporation of Delaware Application November 10, 1955, Serial No. 546,084

9 Claims. (Cl. 197—1)

This invention relates to a printing or typewriting machine, and more particularly to one which can print concomitantly two visible records of desired similar information, one of which may be coded, by actuating a conventional typewriter keyboard on a machine similar to a typewriter.

For many purposes it is useful to produce a record having the meaning of various alphabetic or numeric characters, or both, but expressed in coded arrangements of marks, spots, or dots, which are applied to or on a suitable record surface. Such a record may be made on a card, a sheet, an elongated strip or tape, or on a similar medium. Known machines exist or may be adapted for sensing or translating such a coded record and for using the machine-sensed information to operate typewriters, typesetters, automatic telegraphs, data processing machines, high-speed computers, or other coded-information handling devices.

Obviously, it is desirable that a coded record be checked or proof-read for accuracy before it is used. Unfortunately such coded records cannot be visually read unless the observer has memorized the code, and even then the translation of the code into ordinary characters is difficult, time-consuming, and subject to human error. Add to this the fact that such code marks and their spacings are preferably made as small as possible for economical use of the record surface, and visual reading and translating of the coded record often becomes impossible for all practical purposes.

One object of the present invention therefore, is to provide a machine for producing a visible mark or spot-coded record of condensed size and spacing, and to include an arrangement whereby an observer or operator may readily visually check or proof-read the coded information during or after its production.

An additional object is to eliminate costly permutation apparatus in producing a coded record.

Another object is to provide a code writing machine which may be used by an ordinary typist who has little or no special training, and who need not memorize the code being used.

Still another object is to supply a form of coded record which carries a large amount of coded information in a given area, is capable of use at high speeds, and is inexpensive.

A further object is to design a machine which will type a line-by-line record of information in symbols arranged across the width and down the length of a proof sheet or continuous form, and at the same time will type a separate record of information having the same meaning but in symbols arranged in a single line along the length of a narrow strip or tape. The two records may be put to different uses.

These objects, and others which may become apparent in the following description, are met by providing type means carrying two sets of symbols having the same significance, although the forms of the symbols in one set may differ from the forms of the corresponding symbols in the other set. In the preferred machine shown, a generally conventional typewriter has type bars with type heads carrying pairs of symbols, both a full-size, legible character and a condensed size spot-coded representation of that character adjacent and aligned therewith. The machine is arranged to hold a proof record or sheet and a separate code-record medium opposite two areas of a printing station in such positions that a legible character will be impressed on the proof-record or sheet and the spot-coded representation of that character will be impressed on the code-record simultaneously by a single type action when a particular key is depressed. For producing an easily readable record, the proof-record sheet or other medium is driven in such steps past the printing station as to produce a legibly spaced series of characters, by using the ordinary typewriter carriage escapement. However, in order to condense the coded record for economical use of the record medium, the code spots are not only arranged on each type face within a space substantially narrower than the legible character each code represents, but the drive or escapement for moving the coded record medium is arranged to move in correspondingly smaller steps, considerably shorter than those produced by the usual typewriter escapement. Thus, a proof sheet may be produced in legible characters at conventional spacing, and at the same time a separate condensed coded record is made for future use in other machines. The coded record is preferably made on a narrow strip or tape, on a single line.

Other objects and further details of that which is believed to be novel and included in this invention will be clear from the following description and claims, taken with the accompanying drawing in which is illustrated one example of typewriter embodying the present invention and incorporating type bars carrying both legible characters and coded spots, together with drives for a proof-record sheet and a code-record tape for obtaining different spacings of those records.

Figure 1:
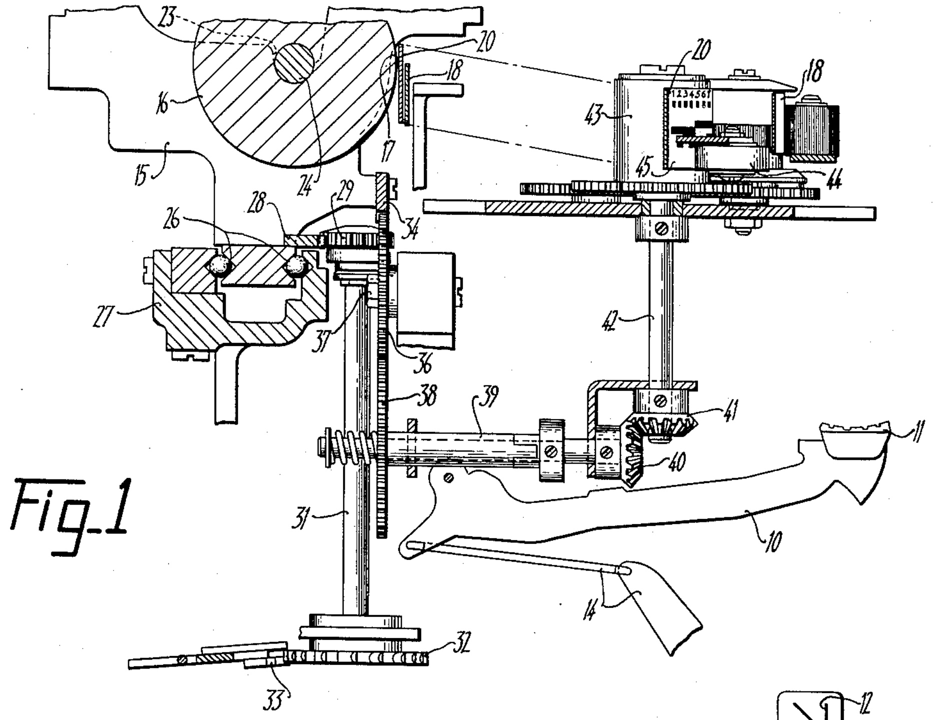
Figure 1 is a vertical sectional side view of portions of an electric typewriter having the features of the present invention applied thereto.
Figure 3:
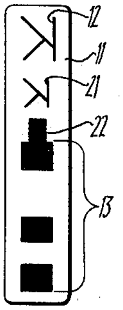
Figure 3 is a view on a still larger scale of a type head face which is actuated to print as a result of depression of the "K" key, showing the legible character and its coded equivalent.

The present invention may be applied to any usual kind of typewriter, whether of the standard or "manual" type, or of the electrically driven type. However, in order to obtain the most uniform and solid impression of all code dots and legible characters, an electric typewriter is probably superior to the manual type because the printing stroke of such a machine is designed to remain uniform regardless of variations in the finger pressure applied to the keys. For this reason the invention will be shown in exemplary fashion applied to portions of an electric typewriter, specifically an "Underwood" machine of the character shown in Patents 2,074,333, Helmond; 2,254,764, Yaeger; 2,262,676, Helmond; 2,395,763, Sagner, or other patents assigned to the same assignee as the present invention. As will become obvious in this specification, the invention may also be applied to typing or printing machines having type means of various other kinds, such as those carrying a font of type faces on the periphery of a single wheel or drum, rather than the more common kind shown here which carries individual characters or faces of the font on the heads of many separate type bars. In any case, the actuation of a single key on the keyboard of the machine will result in the activation of a type means and the typing of a single character or symbol, or the performance of a machine function. Letter spacing ordinarily follows a typing action in such machines.

The usual machine frame or casing, carriage and platen, keyboard, type basket, type bar linkages, and driving mechanisms for the type bar linkages and for the carriage and platen are not shown or described in full here because these parts may be conventional in design and do not per se constitute the present invention. It is sufficient to know that the machine is in most respects of standard design, with the possible exceptions discussed below.

The type basket is fixed in position, there being no "case shift" in this machine. It follows that there is no key or mechanism for case shift purposes.

There is no color shift for the typewriter ribbon, and the ribbon drive is preferably of the single direction type, using "one-time" carbon paper ribbon for uniformly clear and black impressions.

The usual letter-spacing, carriage return, and line stepping mechanisms for the carriage and platen are provided, controlled by appropriate "function" keys or levers on the machine. These, together with the usual guides, rollers, etc., hold and feed a sheet, web, or card through the machine as called for by the operations of the typist. However, in addition to this customary equipment for handling sheets in the machine, a second record-holding and driving mechanism for a separate record medium is provided, as will be explained later.

The keyboard is of standard four-bank pattern, with complete numerical digits from 0 to 9, in addition to a complete alphabet. Some of the usual punctuation and special symbol keys may be eliminated. A set of type bars, with type heads and faces corresponding to the keys, is also provided, with some additions noted below. The type bars 10, only one of which is shown, are of usual form, but they carry type heads 11 of a special kind, bearing not only a set of legible letters, figures and other characters 12, as usual, but also a set of coded representations 13 of these characters paired therewith. Furthermore, type bars and heads are assigned to and connected to be actuated by keys or elements on the machine representing various functional operations of the typewriter, such as letter-space, carriage return, etc. The type heads actuated by these functional keys need carry no legible character representation on their faces, but do carry coded arrangements of dots representing the various functions, when these are desired to be printed in the coded record.

Figure 2:
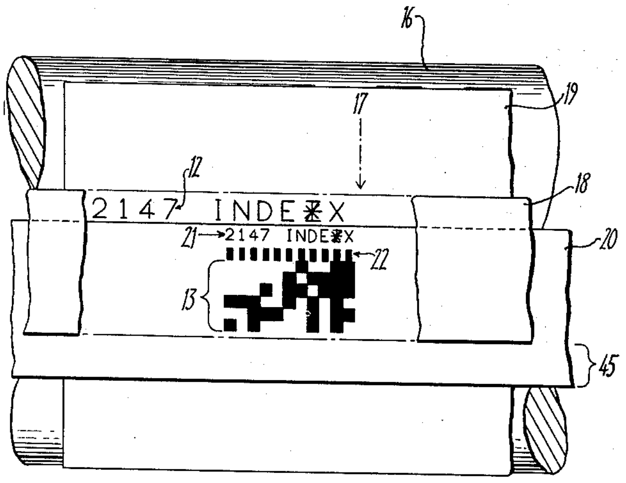
Figure 2 is an enlarged front view of a fragment of the platen of Figure 1, showing the positions of the two record media thereon and a sample of typing as it appears on each record.
Figure 4:
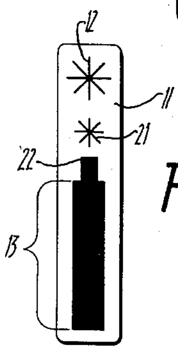
Figure 4 is a view like Figure 3, but showing a type head face which is actuated by depression of an obliterating or "Erase" key.

Before describing the rest of the exemplary machine, one code which may be used for the coded record medium will be explained. This is a simple 6-place binary code, in which a "1" appears as a dot or spot and a zero appears as a blank space. Each coded character is arranged in a single column of spots vertically, with the binary digit (called a "bit") of least significance placed at the bottom of the vertical column, and the sequentially more significant bits above, in their increasing order of significance. The binary value of decimal 2, which is 000010 in the six-place binary code, is used as the code for a "letter space" function. Binary values 3 to 12 are used for coding the decimal digits 0 through 9. This is the well-known "Excess Three" binary numerical code. Binary 13 (001101) is the code for a period or decimal point. Binary 19 is used for the comma. Binary values 20 through 28 are used as the codes for letters A through I; 36 through 44 for J through R; and 53 through 60 for S through Z. A special "Credit" signal (CR) may be represented by binary 49 (110001) or one of the other unused values. Binary 63 (111111) uses up all of the six possible dot positions, and is used to obliterate or "Erase" a previous coded value entered in error, as shown in Figures 2 and 4. Binary zero (000000) can represent "carriage return." This leaves other coded values which may be used for special functions or symbols.

Obviously, other codes could be used, but the one described above will help illustrate the invention because it is a type of code previously known and used in some electronic computers and data processors. It requires no "shift" signal for a change between letters and figures.

The typewriter has the usual frame or casing for supporting the moving parts of the machine, including the keys of a keyboard (not shown) of the sort described above, but having added keys if desired. One such added key may be for the "Erase" code mentioned above and a legible obliterating mark paired with it. Each key is connected in ordinary fashion through a motor-driven snatch roll (not shown) to actuate a type bar linkage 14 which raises a particular type bar 10 with its type head 11 when the corresponding key is depressed. The mechanisms and their operations for typing are so well known as to need no further explanation.

However, when a coded record is being produced, it is sometimes desirable for a code signal to be printed in the record even though nothing but a space appears in the corresponding printed legible record, for instance, when some machine functions are performed. Therefore, each key or lever which actuates the machine to produce a function which it is desired to record in code but not in the legible record, is connected as usual to mechanisms which perform the function in the machine and is also connected by appropriate linkage to actuate a type bar. This type bar carries a head with a coded representation of the function on its face, but carries no character or type face for the legible record.

In a normal fashion as the keys are operated the type head faces on the raised type bars strike one at a time against a platen 16 at a central location 17, which may be called a printing station. See the vertical arrow in Figure 2. In a cylindrical platen machine the type faces are curved as shown in Figure 1, to match the curvature of the platen and to produce an even impression of both the legible face and the coded face at the same time. The upper portion of the type face, carrying the legible character 12, strikes through a carbon ribbon 18, which has been vibrated or lifted by conventional mechanisms to the position indicated in Figure 2. This produces a legible character printing or primary impression on the proof sheet 19 or other first record medium. The proof sheet is held and fed past the printing station on platen 16 in standard spacing steps, by usual carriage and platen moving mechanisms.

The second record medium, preferably an elongated tape 20 of thin tough paper or similar material, is also presented at the printing station, in a position or area adjacent but outside of the location of the legible character printing area. The tape overlies a part of the proof sheet and is shown here as just below and with a portion vertically aligned with the legible character. Suitable guides of known character hold the tape at the proper level and guide it past its assigned portion of the printing station. When a key is depressed, the lower portion of a type face strikes through a ribbon, which may be the same ribbon 18, and this portion impresses the coded record on the tape where it overlies the proof sheet, directly in line with and below the legible character on the proof sheet. A platen is provided for the coded impression, and this may be the platen 16, as shown. However, while the carriage and platen are moving the proof sheet a standard distance to the next usual letter-typing position, the coded tape record is moved horizontally to a lesser degree, corresponding to the narrower coded symbols.

From an inspection of Figure 2 it will be seen that the larger legible chaarcters on the proof sheet 19 are spaced horizontally about twice as far apart on centers as the vertical rows of dots on the code tape 20. This difference in spacing is important if the coded record is to be condensed to a desirable degree. As shown, the coded record may also carry a small conventional representation 21 of the letter or figure being typed, but this small character is not ordinarily legible unless a magnifying or reading glass is used. At the top of the vertical row of code dots an additional, smaller dot 22 may be impressed, which is useful in controlling an automatic reader for the coded record but is not of significance in the present invention, other than to note that this small reader control dot, the small conventional character 21, and the vertical row of coded dots 13 are all confined within horizontal limits substantially smaller than the horizontal space occupied by the corresponding large legible character 12. The example shows 20 pitch size for the coded record symbols.

The carriage 15 and platen 16 are supported, guided and driven by conventional mechanisms, which may include the platen support 23 on the carriage, in which the platen spindle 24 is journalled, and the carriage guides 26 which support and guide the carriage with the platen in the machine frame 27. A spring drum with draw band (not shown) urges the carriage in letter spacing direction. Stepping control of the carriage and platen is obtained through a rack 28, fixed to the carriage, against which a pinion 29 engages. Pinion 29 is suitably rotatably supported in the machine frame as usual, and its rotation is controlled by the vertical shaft 31 to which it is fixed, through a toothed escapement wheel 32 at the bottom end of the shaft, in turn controlled by an escapement dog device 33 in known fashion, to step the carriage after each actuation of a letter key or the space bar.

For most typewriters, including the example shown here, the above described mechanism produces a carriage and platen spacing of about 10 characters to the inch, or 10 pitch. A desired coded record should be spaced about twice as close, or in the order of 20 pitch (20 characters to the inch), or whatever close spacing is found to be practical without destroying good resolution of the coded record in an automatic reader.

If desired, and as shown here, the coded record spots may be impressed in columns directly adjacent each other with no perceptible space between spots in adjoining columns. To obtain the desired close spacing of the coded record, any suitable tape drive of known character may be used, although one satisfactory drive is shown here and described below.

This tape drive gets its motive power from the carriage movement through a tape driving rack 34, fixed to the carriage. Rack 34 is engaged by an idler reduction gear 36, suitably journalled as at 37 in the machine frame, and this gear meshes with and drives a main tape-driving gear 38 on horizontal shaft 39. When gears 36 and 38 are engaged, and the carriage moves, gear 38 turns bevel gear 40, and this bevel, engaged with matching bevel 41, drives the vertical tape shaft 42, to which bevel 41 is fixed. The upper end of the tape shaft carries a capstan 43, against which the tape 20 is pressed for frictional driving engagement, as by the resilient pressure roller 44, bearing against the blank lower portion 45 of the tape and pressing the tape against the capstan.

With this arrangement, as the carriage moves in a regular letter-spacing step, the capstan will be rotated a sufficient distance to drive the tape in a smaller step, the size of which is determined by the ratio between gears 36 and 38 and the diameter of the capstan. As above explained, the tape driving steps are calculated to be about 20 to the inch, or approximately twice as close together as the legible character steps. Other devices might be used for driving the tape. For instance, the tape might be perforated with sprocket holes near its lower edge below the location of the coded record dots, in the blank area 45, and a sprocket wheel engaging the holes could be rotated to move the tape. However, a friction drive such as shown is preferred because there are no holes to weaken the tape.

Whatever tape driving arrangement is used, it is preferably located on the machine frame or casing on the left side of the printing station beyond any guides which may position the tape in its travel past the printing station. Obviously, tensioning devices and reels or spools for the used and unused portions of the tape, and for the ribbon, may be provided in customary fashion.

Carriage return is accomplished as is usual in the ordinary machine, driving the carriage back to line-starting position by the motor and restoring full tension of the spring drum on the draw band, following depression of a carriage return key. See for example Patent 2,262,676, Helmond, above or 2,541,295, Sagner. Automatic line spacing combined with the carriage return is preferred.

Disengagement of the tape drive during carriage return may be taken care of by a one-way clutching arrangement in the drive between rack 34 and capstan 43, or the drive may be disconnected by automatically moving gear 38 out of engagement with idler 36 at the start of carriage return by appropriate mechanism. Arrangements for this purpose as well as the tape drive described above are shown in a copending application of Carl A. Geissler, Serial No. 546,196, filed November 10, 1955, now Patent No. 2,811,235, assigned to the same assignee as the present invention. That application also discloses in more detail than the present case, various other improved mechanisms useful in a machine made according to the present invention.

From the above it will be seen that a condensed coded record of information in the form of a series of symbols is made in the machine by the lower portions of the type faces, which make an impression on the horizontal tape. At the same time that the code record is produced, a separate record of similar significance, but in legible symbols, is made line-by-line on the proof sheet by the upper portions of the type faces paired with the code spots. Because the entire code for each character or function is carried directly by the same type bar which is key-operated to type the character or perform the function, no permutation apparatus is necessary to translate the key operations into coded information. This means that a typist familiar with an ordinary typewriter keyboard may easily operate this machine to produce a coded record.

When the coded record is made on a simple paper strip that need not be perforated, and because the code spots are small and closely spaced, the coded tape is inexpensive, can carry a lot of information in a given length, and is capable of use at high speeds. The single line record on the tape adapts itself to easy storage, handling, and translating of information in machinery using the tape, while the line-by-line record on the proof sheet may be read easily by anyone wishing to check the coded information without passing the record through a translating machine or using a magnifying glass.

As will be evident from the foregoing description, certain aspects of this invention are not limited to the particular details set forth as an example, and it is contemplated that various and other modifications and applications of the invention will occur to those skilled in the art. It is therefore intended that the appended claims shall cover such modifications and applications as do not depart from the true spirit and scope of the invention.

What is claimed as new and is desired to be secured by Letters Patent of the United States is:

1. In a typewriter of the kind having type bars with legible character type faces thereon, and mechanism for actuating said bars to produce a regularly spaced legible record of information for the type faces at a primary printing location on a first record medium in the machine, that improvement for typing a separate coded record of the same information simultaneously with the legible record, comprising a horizontally compressed coded type face representation of a character carried on each type bar adjacent and vertically aligned with its corresponding legible type face, a secondary printing location for the coded type face adjacent the primary printing location, and means horizontally positioning and feeding a second separate code-receiving record medium adjacent the primary printing location past the secondary printing location for the coded type face, and said means driving said second medium past said secondary printing location in spacing steps smaller than the regular spacing of the first medium past the primary printing station, whereby actuation of the type bars will produce a legible record on the first record medium and simultaneously will produce a horizontally condensed coded record of the same information on the second record medium.

2. In a typewriter of the kind having type bars with character type faces thereon, and mechanism for actuating said bars to produce a first regularly spaced record of information from the type faces at a primary printing location on a sheet in the machine, that improvement for typing a second separate record of the same information simultaneously with the first record comprising a second horizontally compressed type face representation of a character carried on each type bar adjacent and vertically aligned with its corresponding first type face, a secondary printing location for the second type face adjacent the primary printing location, and means horizontally positioning and feeding a record-receiving tape adjacent the primary printing location and past the secondary printing location for the second type face, said tape overlying said sheet in part, and said means driving said tape past said secondary printing location in spacing steps smaller than the regular spacing of the sheet past the primary printing station, whereby actuation of the type bars will produce a first record on the sheet and simultaneously will produce a horizontally condensed second record of the same information on the tape.

3. In a typewriter of the kind having type bars with legible character type faces thereon, and mechanism for actuating said bars to produce a first regularly spaced legible record of information from the type faces at a primary printing location on a sheet held and fed in the machine, that improvement for typing a separate coded record of the same information simultaneously with the legible record comprising a horizontally compressed, coded, second type face representation of a character carried on each type bar adjacent and vertically aligned with its corresponding legible type face, a secondary printing location for the coded type face adjacent the primary printing location, and means horizontally positioning and feeding a code-receiving tape adjacent the primary printing location and past the secondary printing location for the coded type face, said tape overlying said sheet in part, and said means driving said tape past said secondary printing location in spacing steps smaller than the regular spacing of the sheet past the primary printing station, whereby actuation of the type bars will produce a legible record on the sheet and simultaneously will produce a horizontally condensed coded record of the same information on the tape.

4. A code writing machine comprising type means carrying two sets of symbols having the same significance, one set including legible characters of a standard legible width, and the other including spot-coded representations of the characters of substantially less width than the legible standard, a given symbol of one significance in one set being located vertically adjacent the symbol of corresponding significance in the other set, a printing station with impression areas adapted to receive impressions concomitantly from the type means of pairs of said symbols, one corresponding symbol from each set, printing means impressing a selected one of said pairs of symbols at said printing station, means supporting and moving a first record medium in standard legible character spacing steps across the printing station opposite the impression area for the legible character symbols, and means supporting and horizontally moving an elongated code record strip in steps substantially smaller than the legible character steps across the printing station opposite the impression area for the corresponding spot-coded symbols, whereby corresponding but separate records are simultaneously impressed through a single action of said type means, the legible record being on the first record medium, and the coded record being on the elongated strip at less than standard legible character spacing.

5. A code writing machine comprising type means carrying two sets of symbols having the same significance, one set including standard legible characters and the other including spot-coded representations of the characters, with the spots arranged in a single row of combinations, a given symbol of one significance in one set being located adjacent and aligned with the symbol of corresponding significance in the other set, a printing station with impression areas adapted to receive impressions concomitantly from the type means of pairs of said symbols, one corresponding symbol from each set, printing means impressing a selected one of said pairs of symbols at said printing station, means moving a first record medium step-wise at one rate at the printing station opposite the impression area for the symbols of one set, and means moving a second separate record medium stepwise at a different rate at the printing station opposite the impression area for the correspondirng symbols of the second set, whereby corresponding but separate and differently spaced records are simultaneously impressed through a single action of said type means, one record being legible, and the other, coded.

6. A code writing machine comprising type means carrying two sets of symbols having the same significance, one set including standard legible characters and the other including coded representations of the characters arranged as a single vertical row of combinations of spots occupying substantially less horizontal space than the width of a standard legible character, a given symbol of one significance in one set being located vertically adjacent and aligned with the symbol of corresponding significance in the other set, a printing station with impression areas adapted to receive impressions concomitantly from the type means of pairs of symbols, one corresponding symbol from each set, printing means impressing a selected one of said pairs of symbols at said printing station, means moving a proof sheet in standard legible character spacing steps across the printing station opposite the impression area for the legible character symbols, and means horizontally moving a code record strip in spacing steps substantially the same width as the code spots across the printing station opposite the impression area for the corresponding spot-coded symbols, whereby corresponding but separate records are simultaneously impressed through a single action of said type means, one record being legible, and the other, coded and compressed.

7. In a typewriter of the kind having type means bearing a set of legible type symbols actuated one at a time to print a first record of information at a printing area on a sheet fed stepwise horizontally in steps of a standard legible pitch for standard letter spacing, that improvement for producing simultaneously a separate and second record of the same information in a condensed, coded form, comprising a set of code symbols, of horizontal size about half that of the legible symbols, carried by said type means vertically adjacent and aligned with the symbols of the first mentioned set so that vertically adjacent impressions of different widths are produced at said printing area from one corresponding symbol each of both sets upon each actuation of the type means, and feeding means for moving an elongated tape across the said sheet stepwise horizontally in steps of a pitch about half as large as those of the sheet feed, past a portion of the printing area which receives impressions from only the code symbols, whereby the second record of information is printed in code in about half the horizontal space along the tape.

8. In a typewriter of the kind having type means bearing a first set of legible type symbols actuated one at a time to print a first line-by-line record of information at a printing area on a sheet fed stepwise both horizontally in steps of a standard legible pitch for letter spacing and vertically for standard line spacing in the machine, that improvement for producing simultaneously a separate and second record of the same information in a different form condensed in spacing, comprising a second set of symbols, of a horizontal size substantially less than the horizontal size of the first set, carried by said type means adjacent the symbols of the first mentioned set so that adjacent impressions of the differing sizes are produced at said printing area from one corresponding symbol each of both sets upon each actuation of the type means, and feeding means for moving an elongated tape stepwise in only horizontal direction in steps of a pitch substantially smaller than those of the sheet feed, past a portion of the printing area which receives impressions from only the symbols of the second set, whereby the second record of information is printed in a smaller size and at a closer spacing in a single line along the tape.

9. In a typewriter of the kind having type means bearing a first set of type symbols of a given size actuated one at a time to print a first line-by-line record of information at a printing area on a sheet fed stepwise both horizontally in steps of a given pitch for letter spacing and vertically for line spacing in the machine, that improvement for producing simultaneously a separate and second record of the same information in a different form and spacing, comprising a second set of symbols, of a size different from that of the first set, carried by said type means adjacent the symbols of the first mentioned set so that adjacent impressions of different size are produced at said printing area from one corresponding symbol each of both sets upon each actuation of the type means, and feeding means for moving an elongated tape stepwise in only horizontal direction in steps of a different pitch from those of the sheet feed, past a portion of the printing area which receives impressions from only the symbols of the second set, whereby the second record of information is printed in a different size and at a different spacing in a single line along the tape.

References Cited in the file of this patent

UNITED STATES PATENTS 1,021,953 Steele ---------------- Apr. 2, 1912
2,502,491 Thompson ------------ Apr. 4, 1950

FOREIGN PATENTS 1,066,549 France ---------------- Jan. 20, 1954